United States Patent [19]

Kagan et al.

[11] Patent Number: 5,114,883
[45] Date of Patent: May 19, 1992

[54] PROCESS FOR THE PREPARATION OF VITREOUS MATERIAL NOTABLY FOR JEWELLERY

[76] Inventors: Rubin Kagan, 3 Place de la Nation, 75011 Paris; Michel Kagan, 36, avenue Jugnot, 75018 Paris; Jean Kagan, 9, rue Guy Labarbe, 94130 Nogent s/Marne, all of France; Livio Verita, Via Paolo Erizzo No. 7, Venise Lido, Italy

[21] Appl. No.: 566,354
[22] PCT Filed: Dec. 12, 1989
[86] PCT No.: PCT/FR89/00647
  § 371 Date: Aug. 28, 1990
  § 102(e) Date: Aug. 28, 1990
[87] PCT Pub. No.: WO90/07471
  PCT Pub. Date: Jul. 12, 1990

[30] Foreign Application Priority Data

Dec. 28, 1988 [FR] France ............... 88 17336

[51] Int. Cl.⁵ .................. C03C 6/02; C03C 3/062; C03C 4/00
[52] U.S. Cl. ................................ 501/32; 501/86
[58] Field of Search .................. 501/4, 32, 86, 1, 10

[56] References Cited

U.S. PATENT DOCUMENTS 2,331,052  10/1943  Shadduck .................... 65/134

FOREIGN PATENT DOCUMENTS 032298  8/1974  Japan ......................... 501/22

OTHER PUBLICATIONS

Glass Technology, vol. 22, No. 1, Feb. 1981 (Sheffield, G.B.) A. A. Ahmed et al.: "Effect of Heat Treatment Crystallization of Cuprous Oxide in Glass", pp. 24–33.
Derwent Japanese Patents Report, vol. 74, No. 36, Oct. 10, 1974; pp. L1–L3 reporting on Japanese Patent Publication No. 74032298.

Primary Examiner—William R. Dixon, Jr.
Assistant Examiner—C. Melissa Bonner
Attorney, Agent, or Firm—Sandler, Greenblum & Bernstein

[57] ABSTRACT

Manufacturing process for a lead silicate based material habing a characteristic coloring ranging from orange-tinged yellow to blood red, having the following steps:
a) preparing a bath or molten mass of lead silicate, produced by mixing lead oxide PbO and silica $SiO_2$ in such proportions that the ratio between the two constituents is 65% by weight of lead oxide and 35% by weight of silica, whereby the temperature of fusion is chosen in the region of 1000° and 1300° C.;
b) introducing into the fusion bath obtained during the foregoing state, copper oxide and a reducing agent, whereby the quantity of this addition is such that the concentration by weight of the copper oxide in the final product is in the region of 6 to 8%, the temperature of the fusion bath being maintained between 1000° amd 1300° C.;
c) maintaining the fusion bath at rest always at the same temperature approximately between 1000° C. and 1300° C. in order to eliminate bubbles;
d) heat treating of the material obtained in this way at a temperature between approximately 500° and 800° C. during a period of time sufficient to form and grow cuprite microcrystals ($Cu_2O$); and
e) slowly cooling the mass obtained to an ambient temperature in order to prevent residual stresses forming therein.

16 Claims, No Drawings

PROCESS FOR THE PREPARATION OF VITREOUS MATERIAL NOTABLY FOR JEWELLERY

BACKGROUND OF THE INVENTION

The present invention relates to a process for the manufacture of a vitreous material exhibiting an ox blood-red colour, capable of being especially employed in jewellery.

SUMMARY OF THE INVENTION

The material which is the subject of the present invention comprises a transparent and colourless vitreous matrix composed essentially of lead silicate, containing a large quantity of cuprite ($Cu_2O$) crystals which make the material opaque and give it a characteristic ox blood-red colour.

The process for manufacturing the material defined above according to the present invention is characterized in that it comprises the following stages:
a) preparation of a lead silicate bath or melt, produced by mixing lead oxide (PbO) and silica ($SiO_2$) in such proportions that the ratio of these two components is 65% by weight of lead oxide and 35% by weight of silica, the melting temperature being approximately between 1000° and 1300° C.,
b) introducing copper oxide and a reducing agent into the melt bath obtained in the above stage, the quantity of this addition of copper being such that the weight concentration of oxide in the final product is approximately from 6 to 8%, the temperature of the melt bath being maintained between 1000° and 1300° C.,
c) maintaining the melt bath at rest, still at the same temperature of approximately 1000° to 1300° C., so as to eliminate bubbles,
d) heat treating of the material thus obtained at a temperature of approximately between 500° and 800° C. for a sufficient time to produce formation and growth of microcrystals of cuprite ($Cu_2O$),
e) slow cooling of the mass obtained to room temperature in order to avoid the formation of residual stresses in this mass.

Siliceous sand and red lead or else a lead silicate sinter can be employed to obtain the basic melt or melt bath during the first stage of the process according to the invention. During this first stage small additions of other components may be provided, such as especially lithium, sodium, potassium, calcium, magnesium, barium, aluminium or phosphorus oxides, and the like, so as to modify the chemical, physical and mechanical properties of the material finally obtained. During the final stage of the heat treatment at a temperature of approximately between 500° and 800° C., the cuprite microcrystals formed during this stage separate from the vitreous material and develop and grow as a function of the temperature and of the residence time. The formation of red crystallites is generally observed in the form of interlaced shoots or branches of variable sizes, of the order of a few microns (preferably approximately two microns) to approximately 2 mm. The longer the residence time at the growth temperature of the crystals, the larger the crystal size. The characteristic bright red colour of the material forming the subject of the present invention is obtained by carrying out the heat treatment of the melt in the temperature range referred to above. With regard to the duration of the treatment, this is a function of the mass of the molten substance treated and of its composition, it being possible for this duration of treatment to vary from a few minutes to several hours. The relative density of the material according to the invention is approximately between 4.0 and 4.5.

DESCRIPTION OF THE PREFERRED EMBODIMENTS

An embodiment of a process of manufacture forming the subject of the present invention has been given below by way of example, no limitation being implied.

In order to obtain a vitreous material with a characteristic ox blood-red colour and comprising micro-inclusions of cuprite crystals, this substance having the following composition (as percentage by weight):

| PbO | 52% | $SiO_2$ | 28% |
|---|---|---|---|
| $Cu_2O$ | 6% | $Sb_2O_3$ | 1% |
| $K_2O$ | 5% | $Na_2O$ | 2.5% |
| $Al_2O_3$ | 2% | CaO | 3% |
| $P_2O_5$ | 0.5% | | | a mixture was prepared in appropriate stoichiometric quantities of siliceous sand, of red lead, of potassium carbonate, of sodium felspar, of sodium phosphate and of calcium carbonate, and this mixture was melted at a temperature of the order of 1200° C.

After the melting was accomplished, the appropriate quantities of $Cu_2O$ and of metallic antimony, referred to above, were added, while stirring vigorously so as to obtain a homogeneous liquid, the bath being kept at a temperature of approximately 1200° C. during these additions.

While this same temperature was still being maintained the melt bath was left to stand at rest in order to eliminate bubbles, the time at rest being of the order of a few minutes to approximately half an hour.

At the end of the refining carried out in this way the heat treatment of the mixture at a temperature of the order of 600° C. was carried out for a necessary time, depending on the mass treated, so as to produce the formation and the growth of the microcrystals of cuprite ($Cu_2O$) in the mass of the material. After the heat treatment referred to above the material was left to cool slowly to room temperature in order to avoid therein the formation of residual stresses in its mass.

A vitreous mass with a characteristic ox blood colour was thus obtained, exhibiting a large quantity of star-shaped cuprite crystals in the form of micro-inclusions, imparting to it the said characteristic colour and making the vitreous mass opaque. The relative density of the resulting material was approximately 4.2.

This material can be worked when heated like vitreous materials, or cut, ground and polished like any hard stone. It may be employed preferably in jewellery. Its colour can be homogeneous or can exhibit regions of different tints in a colour range extending from orangy yellow to dark red, depending on the size of the cuprite microcrystals, the smaller crystals give an orangy yellow colour while the larger crystals give a dark red colour to the material.

It remains obvious that the present invention is not limited to the examples of embodiment which are described but that it encompasses all its alternative forms.

We claim:
1. A process for the manufacture of vitreous material exhibiting a characteristic color ranging from orangish- yellow to ox blood-red, based on lead silicate, comprising:
  a) preparing a lead silicate melt, by mixing lead oxide and silica to obtain a mixture comprising 65% by weight of lead oxid and 35% by weight silica, based on the total weight of the melt, at a melting temperature between about 1000° C. to 1300° C.;
  b) adding copper oxide and antimony into the melt of step (a), the quantity of the addition being sufficient to obtain a final product having a copper oxide content of about 6 to 8% by weight, and maintaining the temperature of the melt between about 1000° C. and 1300° C.;
  c) maintaining the melt at rest at a temperature of about 1000° to 1300° C., so as to eliminate bubbles;
  d) heat treating of material resulting from step (c) at a temperature of between about 500° C. and 800° C. for a time sufficient to produce formation and growth of microcrystals of cuprite; and
  e) slow cooling of material resulting from step (d) to room temperature in order to avoid formation of residual stresses therein.

2. The process according to claim 1, wherein the melt of step (a) is prepared by mixing siliceous sand and red lead.

3. The process according to claim 1, wherein the melt of step (a) is prepared by adding a lead silicate sinter.

4. The process according to claim 1, wherein during step (a) additional components are added to modify the chemical, physical and mechanical properties of the vitreous material.

5. The process according to claim 4, wherein said additional components comprise a member selected from the group consisting of oxides of lithium, sodium, potassium, calcium, magnesium, barium, aluminum, and phosphorus, and mixtures thereof.

6. The process according to claim 1, wherein the maintaining at rest of step (c) is from about a few minutes to about half an hour.

7. The process according to claim 1, wherein the heat treating of step (d) is performed at a temperature and a residence time so as to obtain a desired size of the microcrystals of cuprite.

8. A material comprising a transparent and colorless vitreous matrix composed essentially of lead silicate glass comprising a large quantity of crystals of cuprite which make the material opaque and give it a color ranging from orangish-yellow to ox blood-red, the relative density of the material being between about 4.0 and 4.5, said material being produced by a process comprising:
  a) preparing a lead silicate melt, by mixing lead oxide and silica to obtain a mixture comprising 65% by weight of lead oxide and 35% by weight silica, based on the total weight of the melt, at a melting temperature between about 1000° C. and 1300° C.;
  b) adding copper oxide and antimony into the melt of step (a), the quantity of the addition being sufficient to obtain a final product having an oxide content of about 6 to 8% by weight, and maintaining the temperature of the melt between about 1000° C. and 1300° C.;
  c) maintaining the melt at rest at a temperature of about 1000° to 1300° C., so as to eliminate bubbles;
  d) heat treating of material resulting from step (c) at a temperature of between about 500° C. and 800° C. for a time sufficient to produce formation and growth of microcrystals of cuprite; and
  e) slow cooling of material resulting from step (d) to room temperature in order to avoid formation of residual stresses therein.

9. A material comprising a transparent and colorless vitreous matrix composed essentially of lead silicate glass comprising a large quantity of crystals of cuprite which make the material opaque and give it a color ranging from orangish-yellow to ox blood-red, the relative density of the material being between about 4.0 and 4.5, said material being produced by a process comprising:
  a) preparing a lead silicate melt, by mixing lead oxide and silica to obtain a mixture comprising 65% by weight of lead oxide and 35% by weight silica, based on the total weight of the melt, at a melting temperature between about 1000° C. and 1300° C.;
  b) adding copper oxide and a reducing agent into the melt of step (a), the quantity of the addition being sufficient to obtain a final product having an oxide content of about 6 to 8% by weight, and maintaining the temperature of the melt between about 1000° C. and 1300° C.;
  c) maintaining the melt at rest at a temperature of about 1000° C. to 1300° C., so as to eliminate bubbles;
  d) heat treating of material resulting from step (c) at a temperature of between about 500° C. and 800° C. for a time sufficient to produce formation and growth of microcrystals of cuprite; and
  e) slow cooling of material resulting from step (d) to room temperature in order to avoid formation of residual stresses therein; and
  said material comprising the following composition as percentage by weight:

| PbO | 52% | $SiO_2$ | 28% |
|---|---|---|---|
| $Cu_2O$ | 6% | $Sb_2O_3$ | 1% |
| $K_2O$ | 5% | $Na_2O$ | 2.5% |
| $Al_2O_3$ | 2% | CaO | 3% |
| $P_2O_5$ | 0.5%. | | |

10. A material comprising a transparent and colorless vitreous matrix composed essentially of lead silicate glass comprising a large quantity of crystals of cuprite which make the material opaque and give it a color ranging from orangish-yellow to ox blood-red, the relative density of the material being between about 4.0 and 4.5, said material being produced by a process comprising:
  a) preparing a lead silicate melt, by mixing lead oxide and silica to obtain a mixture comprising 65% by weight of lead oxide and 35% by weight silica, based on the total weight of the melt, at a melting temperature between about 1000° C. and 1300° C.;
  b) adding copper oxide and a reducing agent into the melt of step (a), the quantity of the addition being sufficient to obtain a final product having an oxide content of about 6 to 8% by weight, and maintaining the temperature of the melt between about 1000° C. and 1300° C.;
  c) maintaining the melt at rest at a temperature of about 1000° C. to 1300° C., so as to eliminate bubbles;
  d) heat treating of material resulting from step (c) at a temperature of between about 500° C. and 800° C. for a time sufficient to produce formation and growth of microcrystals of cuprite; and e) slow cooling of material resulting from step (d) to room temperature in order to avoid formation of residual stresses therein; and said orangish-yellow color is obtained due to the presence of small-sized cuprite crystals, while the ox blood-red color is obtained due to the presence of cuprite crystals of larger size.

11. The material according to claim 10, wherein the size of said cuprite crystals varies between about 2 microns and 2 mm.

12. A jewelry material comprising a transparent and colorless vitreous matrix composed essentially of lead silicate glass comprising a large quantity of crystals of cuprite which make the material opaque and give it a color ranging from orangish-yellow to ox blood-red, the relative density of the material being between about 4.0 and 4.5.

13. The jewelry material according to claim 12, comprising the following composition as percentage by weight:

| | | | |
|---|---|---|---|
| PbO | 52% | SiO$_2$ | 28% |
| Cu$_2$O | 6% | Sb$_2$O$_3$ | 1% |
| K$_2$O | 5% | Na$_2$O | 2.5% |
| Al$_2$O$_3$ | 2% | CaO | 3% |
| P$_2$O$_5$ | 0.5% | | |

14. The jewelry material according to claim 12, wherein the orangish-yellow color is obtained due to the presence of small-sized cuprite crystals, while the ox blood-red color is obtained due to the presence of cuprite crystals of larger size.

15. The jewelry material according to claim 14, wherein the size of said cuprite crystals varies between about 2 microns, and 2 mm.

16. A jewelry material produced by the process of claim 1.

* * * * *